(12) United States Patent
Haag et al.

(10) Patent No.: US 12,739,048 B2
(45) Date of Patent: Sep. 15, 2026

(54) INITIATING A COMMUNICATION OR CONNECTIVITY SERVICE BETWEEN A FIRST LOCATION AND A SECOND LOCATION BASED ON OPTICAL DATA TRANSMISSION OF A USER-DEFINED OPTICAL SIGNAL

(71) Applicant: Deutsche Telekom AG, Bonn (DE)

(72) Inventors: Thomas Haag, Rodgau (DE); Werner Weiershausen, Eppertshausen (DE)

(73) Assignee: Deutsche Telekom AG, Bonn (DE)

( * ) Notice: Subject to any disclaimer, the term of this patent is extended or adjusted under 35 U.S.C. 154(b) by 223 days.

(21) Appl. No.: 18/704,967

(22) PCT Filed: Oct. 31, 2022

(86) PCT No.: PCT/EP2022/080349

§ 371 (c)(1),
(2) Date: Apr. 26, 2024

(87) PCT Pub. No.: WO2023/078831

PCT Pub. Date: May 11, 2023

(65) Prior Publication Data

US 2025/0274214 A1 Aug. 28, 2025

(30) Foreign Application Priority Data

Nov. 3, 2021 (EP) .................................... 21206263

(51) Int. Cl.
*H04J 14/02* (2006.01)
*H04L 12/28* (2006.01)

(52) U.S. Cl.
CPC ...... *H04J 14/0256* (2013.01); *H04J 14/0267* (2013.01); *H04L 12/2856* (2013.01)

(58) Field of Classification Search
None
See application file for complete search history.

(56) References Cited

FOREIGN PATENT DOCUMENTS

WO WO 2018229059 A1 12/2018

OTHER PUBLICATIONS

Paolucci et al., “Enabling transparent lambda services between metro and core networks”, Dec. 6, 2011, Photonic Network Communications, vol. 23, pp. 137-147 (Year: 2011).*

(Continued)

*Primary Examiner* — David W Lambert
(74) *Attorney, Agent, or Firm* — LEYDIG, VOIT & MAYER, LTD.

(57) ABSTRACT

A method for initiating, via a telecommunications network, a communication or connectivity service between a first location and a second location based on optical data transmission of a user-defined optical signal includes: in a first step, an optical initialization signal is fed or input to an optical data transmission fiber; in a second step, the optical initialization signal is received by an optical safety and policy entity or functionality of the telecommunications network, and an identity of the optical initialization signal is determined by the optical safety and policy entity or functionality; and in a third step, dependent on the determined identity of the optical initialization signal, the communication or connectivity service between the first location and the second location is activated.

14 Claims, 3 Drawing Sheets

(56) References Cited

OTHER PUBLICATIONS

Francesco Paolucci et al: "Enabling transparent lambda services between metro and core networks", Photonic Network Communications, Kluwer Academic Publishers, BO, vol. 23, No. 2, Dec. 6, 2011 (Dec. 6, 2011), pp. 137-147, XP035027605, Germany.

* cited by examiner

INITIATING A COMMUNICATION OR CONNECTIVITY SERVICE BETWEEN A FIRST LOCATION AND A SECOND LOCATION BASED ON OPTICAL DATA TRANSMISSION OF A USER-DEFINED OPTICAL SIGNAL

CROSS-REFERENCE TO PRIOR APPLICATIONS

This application is a U.S. National Phase application under 35 U.S.C. § 371 of International Application No. PCT/EP2022/080349, filed on Oct. 31, 2022, and claims benefit to European Patent Application No. EP 21206263.2, filed on Nov. 3, 2021. The International Application was published in English on May 11, 2023 as WO 2023/078831 A1 under PCT Article 21(2).

FIELD

The present invention relates a method for initiating to provide, via a telecommunications network, a communication or connectivity service between a first location and at least a second location based on optical data transmission of a user-defined optical signal, wherein the telecommunications network comprises a backbone network and/or an aggregation network as well as an access network, and the telecommunications network and its infrastructure being used to both provide end-user communication services and/or IP connectivity to a multitude of end-users connected to the access network, and connect the first location and the at least second location via at least access network infrastructure and/or aggregation network infrastructure comprising a plurality of optical network nodes.

Furthermore, the present invention relates to a broadband access network or telecommunications network for initiating to provide, via the telecommunications network, a communication or connectivity service between a first location and at least a second location based on optical data transmission of a user-defined optical signal, wherein the telecommunications network comprises a backbone network and/or an aggregation network as well as the access network, and the broadband access network and the telecommunications network and its infrastructure being used to both provide end-user communication services and/or IP connectivity to a multitude of end-users connected to the access network, and connect the first location and the at least second location via at least access network infrastructure and/or aggregation network infrastructure comprising a plurality of optical network nodes.

Additionally, the present invention relates to a system for initiating to provide, via a telecommunications network, a communication or connectivity service between a first location and at least a second location based on optical data transmission of a user-defined optical signal, wherein the telecommunications network comprises a backbone network and/or an aggregation network as well as an access network, and the broadband access network and the telecommunications network and its infrastructure being used to both provide end-user communication services and/or IP connectivity to a multitude of end-users connected to the access network, and connect the first location and the at least second location via at least access network infrastructure and/or aggregation network infrastructure comprising a plurality of optical network nodes.

Additionally, the present invention relates to an optical safety and policy entity or functionality or central office point of delivery provided to be used as part of a system or as part of a broadband access network or telecommunications network according to embodiments of the present invention.

Furthermore, the present invention relates to a program and to a computer-readable medium for operating a broadband access network of a telecommunications network according to embodiments of the present invention.

BACKGROUND

The exchange of information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

In conventionally known or current telecommunications networks, typically having or comprising broadband access networks and/or aggregation networks that have or comprise central office points of delivery, many end-users or subscribers are connected to be provided with communication services and/or IP connectivity.

Typically in such broadband access networks, end-users or subscribers operate customer premises equipment or home gateway devices in order to establish a (mostly wireline) connection to access nodes of the broadband access network, typically as part of or located at a central office point of delivery.

At such access nodes and/or at the respective central office point of delivery, such communication services and/or IP connectivity are/is provided (to the end-users or subscribers) based on electrical or electronical processing and/or communication technology—hence, even in case the end-users or subscribers are connected to the access node or central office point of delivery using wireline optical data transmission links (such as, e.g., a passive optical network, PON), such end-user data, or, rather, the respective signals carrying these data (in uplink direction), are converted to and processed as electrical signals in the respective access node and/or the respective central office point of delivery, and—in case of a long-distance transmission requirement of at least a part of such (uplink) end-user data—optical signals are used to carry these end-user data, via a backbone part of the network and/or an aggregation part (or ring) of the network, towards other (typically faraway) network entities or network nodes.

According to such a mode of operation of conventionally known telecommunications networks, it might be possible to connect an end-user via an optical data transmission line (such as, e.g., via a passive optical network, PON, or also via a point-to-point optical transmission line), however the respective signals carrying the end-user's data (i.e. the end-user's data, in uplink direction, originating from the end-user's home gateway or customer premises equipment, as well as the end-user's data, in downlink direction, destinated to the end-user's home gateway or customer premises equipment) are necessarily processed as electrical signals by the respective access node and/or by the respective central office point of delivery through which the considered end-user is connected to the telecommunications network.

This also means, on the one hand, at least a twofold conversion from the optical domain towards the electrical domain and from the electrical domain towards the optical domain, and, on the other hand and as a consequence thereof, that it is impossible to transmit a user-defined optical signal between a first location connected to the telecommunications network towards a second location connected to the telecommunications network in a transparent manner without at least physically modifying the user-defined optical signal.

SUMMARY

In an exemplary embodiment, the present invention provides a method for initiating, via a telecommunications network, a communication or connectivity service between a first location and a second location based on optical data transmission of a user-defined optical signal. The telecommunications network comprises a backbone network and/or an aggregation network as well as an access network, and the telecommunications network is used to (1) provide end-user communication services and/or IP connectivity to a multitude of end-users connected to the access network, and (2) connect the first location and the second location via at least access network infrastructure and/or aggregation network infrastructure comprising a plurality of optical network nodes. The telecommunications network comprises, at the first location, at least one optical data transmission fiber for providing the communication or connectivity service. The method comprises the following steps: in a first step, an optical initialization signal is fed or input to the optical data transmission fiber; in a second step, the optical initialization signal is received by an optical safety and policy entity or functionality of the telecommunications network, and an identity of the optical initialization signal is determined by the optical safety and policy entity or functionality: and in a third step, dependent on the determined identity of the optical initialization signal, the communication or connectivity service between the first location and the second location is activated.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
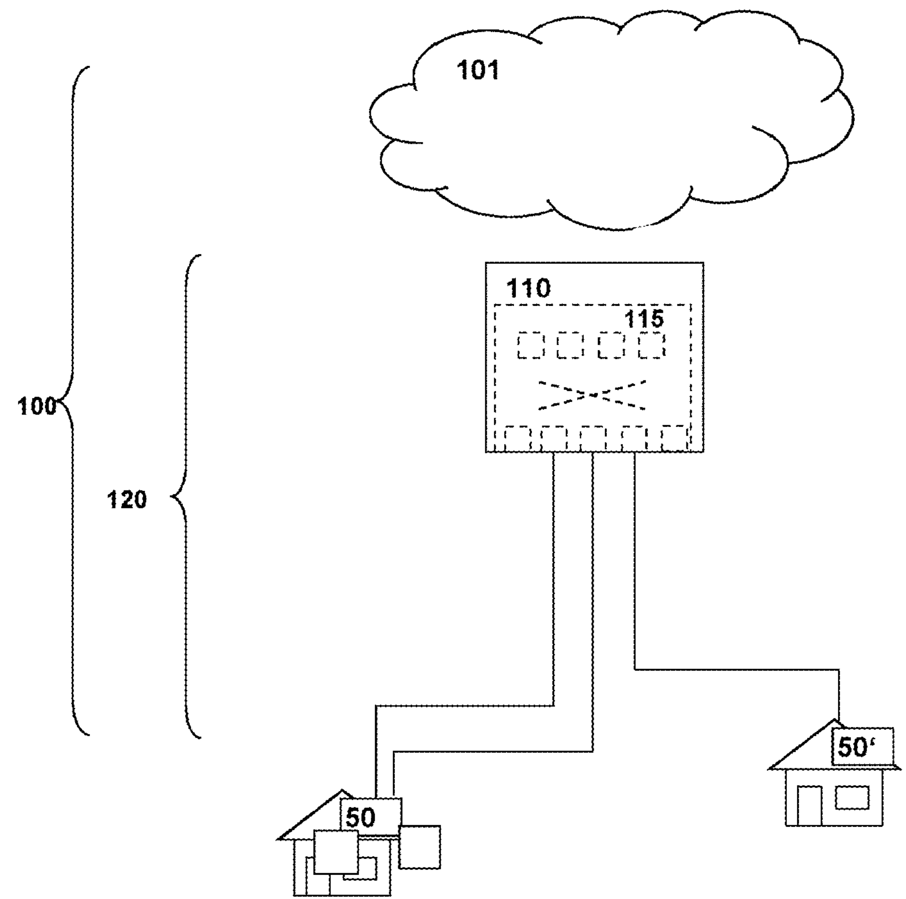
FIG. 1 schematically illustrates a telecommunications network according to the present invention, having a broadband access network with a central office point of delivery, providing end-user communication services and/or IP connectivity to a multitude of end-users connected to the access network.

Exemplary embodiments of the present invention provide a technically simple, effective and cost effective solution for initiating to provide, via a telecommunications network, a communication or connectivity service between a first location and at least a second location based on optical data transmission of a user-defined optical signal, wherein the telecommunications network and its infrastructure is able to be used to both provide end-user communication services and/or IP connectivity to end-users, and as well as to connect the first and second location via a plurality of optical network nodes for the user-defined optical signal to be transmitted transparently and essentially without being modified between the first and second location. Further exemplary embodiments of the present invention provide a corresponding broadband access network or corresponding telecommunications network, a corresponding system, a corresponding optical safety and policy entity or functionality or central office point of delivery comprising an optical safety and policy entity or functionality.

Exemplary embodiments of the present invention provide a method for initiating to provide, via a telecommunications network, a communication or connectivity service between a first location and at least a second location based on optical data transmission of a user-defined optical signal,

- wherein the telecommunications network comprises a backbone network and/or an aggregation network as well as an access network, and the telecommunications network and its infrastructure being used to both
  - provide end-user communication services and/or IP connectivity to a multitude of end-users connected to the access network, and
  - connect the first location and the at least second location via at least access network infrastructure and/or aggregation network infrastructure comprising a plurality of optical network nodes,
- wherein the telecommunications network comprises, at the first location, at least one optical data transmission fiber for providing the communication or connectivity service,
- wherein, in order to initiate the communication or connectivity service, the method comprises the following steps:
  - in a first step, an optical initialization signal is fed or input to the optical data transmission fiber,
  - in a second step, the optical initialization signal is received by an optical safety and policy entity or functionality of the telecommunications network, and the identity of or associated to the optical initialization signal is determined by the optical safety and policy entity or functionality,
  - in a third step, dependent on the determined identity of the optical initialization signal, the communication or connectivity service between the first location and the second location is activated.

It is thereby advantageously possible according to the present invention to initiate or set up an optical point-to-point transmission such as to provide such a transmission solution between the first and second location such that the user-defined optical signal is transmitted, through the telecommunications network and all its considered network nodes in an essentially unmodified manner, i.e. the user-defined optical signal—transported or transmitted in the direction from the first location to the second location, and transmitted by an optical hardware device at the first location—is able to be received, via a further optical receiver hardware at the second location, essentially as it has been transmitted or sent, i.e. especially it is received, e.g. using the same optical modulation scheme, as it was transmitted. For example, it is advantageously possible according to the present invention to provide an optical service between the first and second location of the telecommunications network in the form of a so-called lambda-service, especially for business customers of the telecommunications network, while still providing end-user communication services and/or IP connectivity to a multitude of end-users using the same backbone network and/or aggregation network infrastructure of the telecommunications network. Such business customers are often other carriers (i.e. operators of other telecommunications networks) within wholesale contracts, such as, e.g., mobile network operators, MNO, who could use lambda services as transport enablers, e.g. for 5G mobile front- and backhaul. According to the present invention, a lambda service allows for the freedom of the user to produce any kind of protocol or bandwidth (between the first and second location, i.e. the user-defined optical signal is completely user-defined and the operator of the transport telecommunications network (providing the forwarding of the user-defined optical signal between the first and second location) only provides the—especially all-optical—transmission or forwarding functionality (between the first and second location) without interfering and/or imposing conditions regarding the user-defined optical signal other than conditions such as to assure the functionality and to avoid damage to the optical transmission network of the telecommunications network).

Furthermore, according to the present invention, it is advantageously possible to comparatively easily initiate or set up—via the optical initialization signal—the optical point-to-point transmission such as to provide such the transmission solution between the first and second location. Hereinafter, the initiation is also called first sign of life or first sign of life procedure: The first sign of life comes from the customer, i.e. the optical initialization signal is fed to or input to the optical data transmission fiber (hereinafter also called first optical data transmission fiber) at the first location.

It is advantageously possible according to the present invention that the customer may plug any device and may inject any light or signal into a "dark fiber end" (i.e. the (first) optical data transmission fiber) at its premises location (or at whatever location a dark fiber end of the network operator who offers the lambda or spectrum services is available).

According to the present invention, the optical initialization signal is fed or input, in a first step, to the (first) optical data transmission fiber. In a second step, the optical initialization signal is received by the optical safety and policy entity or functionality of the telecommunications network, and the identity of or associated to the optical initialization signal is determined by the optical safety and policy entity or functionality. In a third step, dependent on the determined identity of the optical initialization signal, the communication or connectivity service between the first location and the second location is activated.

According to the present invention, it is advantageously possible that any physical property of the optical initialization signal (such as, e.g., the wavelength, the spectrum width, the intensity, or the behavior of the optical initialization signal over time) is potentially able to be used to determine the identity and/or the validity of the optical initialization signal and/or of the customer.

Furthermore, according to the present invention, it is advantageously possible to provide the communication or connectivity service (or lambda service) as a complement to service offerings at the IP layer (i.e. providing end-user communication services and/or IP connectivity). Especially, the lambda service provides for a free transmission of any possible protocol without principal technical limitations by the network elements used by the host (hosting carrier), i.e. the transporting telecommunications network. As the carrier (i.e. the telecommunications network) still needs control, the present invention provides a solution to support such unlimited lambda services with comprehensive control options by the host telecommunications network.

According to the present invention, it is furthermore advantageously possible that the customer of the lambda service (i.e. the user feeding or inputting the user-defined optical signal at the first location and receiving it at the second location) is able to use their own optical interfaces (transmitter and receiver) while the service provider (i.e. the telecommunications network) only supplies the fiber network for optical interconnection, typically in a defined optical spectral range or optical window.

According to the present invention, there are different modes of operation, especially regarding how the first location is connected to the telecommunications network, or its aggregation network infrastructure and/or backbone network infrastructure:

- according to a first mode, a passive fiber network is used, e.g. the network provider (i.e. the telecommunications network) supplies a fiber link or a fiber network (e.g. PON tree network);
- according to a second mode, an active fiber-optical network is used, e.g. the network provider (i.e. the telecommunications network) supplies an amplified and channelizable (optical) network, i.e. a WDM network (wavelength division multiplex network) with optical amplifiers and spectral filters, maybe even switchable optical nodes (ROADMs, reconfigurable optical add drop multiplexers).

It is furthermore advantageously possible according to the present invention that the optical signal (i.e. the user-defined optical signal) being delivered by the customer (of the telecommunications network) itself can be used as agnostic underlay layer for any other higher-layer protocols on top (e.g. for Layer 1/OTN services, for Layer 2/Ethernet services, for Layer 3/IP services and/or SD-WAN (software defined wide area network)/OTT (over the top) or else). Furthermore, it is advantageously possible according to the present invention that the end-to-end lambda service is managed by a disaggregated architecture, including several user plane (UP) and control plane (CP) functional building blocks that are placed especially at central office points of delivery (PODs), at network elements along the service route, at hierarchical controller and orchestrator entities and OSS/BSS entities.

The telecommunications network according to the present invention might be a fixed-line telecommunications network or a mobile communication network but could also have both aspects, i.e. parts of a fixed-line telecommunications network (or being a fixed-line telecommunications network in such parts) and parts of a mobile communication network (or being a mobile communication network in such parts); such networks are also known under the term fixed-mobile-convergence networks (FMC networks).

Furthermore, it is advantageously possible and preferred according to the present invention that the telecommunications network comprises, at the second location, at least one further optical data transmission fiber (hereinafter also called second optical data transmission fiber) for providing the communication or connectivity service, wherein especially, between the first and second location, the telecommunications network comprises a transmission functionality regarding the backbone network and/or aggregation network and/or the access network that is based exclusively or almost exclusively on optical data transmission.

It is thereby advantageously possible to initiate the communication or connectivity service between the first and second location without the need of any parallel control plane connectivity between a (customer-defined) optical transmitting hardware located at the first location and the optical safety and policy entity or functionality.

That the communication or connectivity service between the first and second location, or the corresponding transmission functionality, is based exclusively or almost exclusively on optical data transmission refers to there being no substantial conversion of the optical signals into the electrical domain, and if yes at most for regeneration purposes of the optical signal; that there is no substantial conversion (or no conversion at all) of the optical signals into the electrical domain is the case if all-optical regenerators (or all-optical repeaters) are used for the regeneration of the optical signal but also in case that an optical signal (that is to be transmitted through the telecommunications network, especially at or between two network nodes) needs to be regenerated at a specific position along the transmission path and furthermore in case that such a specific regeneration of the optical signal requires an electrical conversion of the optical signal (and, thereafter, a back conversion to the regenerated optical signal via using an optical-electrical-optical regenerator or repeater). In other words, the telecommunications network especially comprises a transmission functionality regarding the backbone network and/or aggregation network and/or the access network such that the user-defined optical signal is characterized by an optical modulation scheme, wherein a transmission path between the first location and the second location comprises an optical transmission path comprising the first optical data transmission fiber and the second optical data transmission fiber, and wherein the transmission functionality is arranged such that the optical modulation scheme is maintained throughout the optical transmission path, wherein especially the transmission path is identical with the optical transmission path. Via maintaining the optical modulation scheme throughout the transmission path of the user-defined optical signal, it is advantageously possible that the user-defined optical signal is received, at the second location, as it is (or has been) fed or input at the first location, i.e. essentially without (necessarily) being modified between the first and second location.

According to a further preferred embodiment of the present invention, in a fourth step, a further optical initialization signal is fed or input to the further optical data transmission fiber (or second optical data transmission fiber), and wherein, in a fifth step, the further optical initialization signal is received by a further optical safety and policy entity or functionality of the telecommunications network, and the identity of the further optical initialization signal is determined by the further optical safety and policy entity or functionality, wherein the establishment or activation of the communication or connectivity service between the first location and the second location is activated dependent on both the determined identity of the optical initialization signal and the determined identity of the further optical initialization signal.

It is thereby advantageously possible that an initialization is required both at the first location (via the optical initialization signal) and at the second location (via the further optical initialization signal) in order to establish or activate the communication or connectivity service between the first location and the second location. According to an alternative embodiment, only the optical initialization signal is required at the first location in order to establish or activate the communication or connectivity service between the first location and the second location.

According to a further preferred embodiment of the present invention, the establishment or activation of the communication or connectivity service between the first location and the second location is refused in case that identity determination of one or both of the optical initialization signal and the further optical initialization signal fails, wherein especially the transmission functionality of the telecommunications network, especially with regard to the backbone network and/or the aggregation network, is protected by the optical safety and policy entity or functionality and/or by the further optical safety and policy entity or functionality.

Thereby, it is advantageously possible to easily and effectively implement a method according to embodiments of the present invention.

According to a further preferred embodiment of the present invention, determining the identity of the optical initialization signal and/or of the further optical initialization signal is based on determining the or at least part of the physical properties of the initialization signal and/or of the further initialization signal, and especially involves determining one or a plurality of the following:

- the spectrum of the initialization signal and/or of the further initialization signal,
- the amplitude or the power of the initialization signal and/or of the further initialization signal,
- a time stamp information of the initialization signal and/or of the further initialization signal,
- an identity information, especially as a pilot tone, especially a low frequency modulation, or as pilot frequency, of the initialization signal and/or of the further initialization signal.

It is thereby advantageously possible to comparatively easily and efficiently determine the identity of the optical initialization signal (and/or of the further optical initialization signal) via analyzing, regarding the initially incoming light (i.e. the (further) optical initialization signal), its spectrum, amplitude/power, time stamps, topological information (such as which fiber and/or which port is used). These data are especially able to be compared with data of a business support system, BSS, or data base.

According to a further preferred embodiment of the present invention, the broadband access network comprises the optical safety and policy entity or functionality connecting the first location and/or the first optical data transmission fiber to the telecommunications network, especially its transmission functionality, wherein the optical safety and policy entity or functionality provides for a protection of the optical transmission functionality, especially with regard to the backbone network and/or the aggregation network, a policy decision functionality, and a policy enforcement functionality regarding the user-defined optical signal and/or the further user-defined optical signal, wherein especially the broadband access network comprises at least one central office point of delivery comprising or being coupled with the optical safety and policy entity or functionality, wherein especially the central office point of delivery connects the first location and/or the first optical data transmission fiber to the telecommunications network, especially its transmission functionality, wherein especially the broadband access network comprises a further central office point of delivery that connects the second location and/or the second optical data transmission fiber to the telecommunications network, especially its transmission functionality, wherein especially thereby the communication or connectivity service between the first location and the second location is able to be realized as an optical and transparent user plane point-to-point connection.

Via using the optical safety and policy entity or functionality (and the further optical safety and policy entity or functionality), it is advantageously possible to connect the first location (or the first optical data transmission fiber) more or less directly to the optical domain of the telecommunications network, i.e. especially the aggregation network and/or the backbone network, and thereby to provide for an all-optical (or at least almost all-optical) transmission link between the first and second location (and, likewise, in opposite direction, from the second location to the first location). The protecting functionality of the optical safety and policy entity or functionality as well as the policy decision and policy enforcement functionalities ensure that the telecommunications network is protected and the communication or connectivity service is used according to agreed service level agreements, SLA.

Preferably according to the present invention, such protection also applies regarding the (further) optical initialization signal, and especially is applied generally or continuously; this feature being especially important as third-party (customer-defined) hardware is used at the ends of the first and/or second optical data transmission fibers (i.e. at the first and second locations) that the operator of the telecommunications network does not necessarily control.

According to the present invention, it is advantageously possible and preferred that the central office point of delivery comprises a plurality of access nodes and an orchestrator entity or functionality, wherein the plurality of access nodes especially provide optical network termination functionality to one or a plurality of end-users in view of the end-users being provided with IP connectivity by the telecommunications network, wherein the end-users are connected to the telecommunications network via access network infrastructure, especially at least partly optical fiber infrastructure.

Thereby, it is advantageously possible to easily and effectively implement a method according to embodiments of the present invention.

According to a further embodiment of the present invention, the first location is connected to the central office point of delivery, via the first optical data transmission fiber, using at least one of the following:

a passive optical fiber as a point-to-point link, an active optical fiber, i.e. optically amplified, a passive optical network, especially a PON, e.g. XGS-PON, PON-tree or a part thereof.

Thereby, it is advantageously possible to use different possible optical connections of the first and/or second location to the telecommunications network, especially its backbone network and/or aggregation network infrastructure.

It is furthermore preferred that a further user-defined optical signal is fed or input to the second optical data transmission fiber and received at the first optical data transmission fiber, wherein the further user-defined optical signal is likewise a user-defined optical signal, wherein especially the user-defined optical signal and the further user-defined optical signal are transmitted, between the first and second location, in a transparent and/or optically rather unchanged manner (except, of course, for physically inevitable signal distortions, dispersion and/or attenuations along the optical transmission path), especially such that the user-defined optical signal is received, at the second optical data transmission fiber as it has been fed or input to the first optical data transmission fiber, and especially such that the further user-defined optical signal is received, at the first optical data transmission fiber as it has been fed or input to the second optical data transmission fiber, wherein especially the optical transmission functionality is agnostic to both the user-defined optical signal and the further user-defined optical signal, which are transmitted by the optical transmission functionality freely and using any technically possible protocol.

Furthermore, the present invention relates to a broadband access network or to a telecommunications network for initiating to provide, via the telecommunications network, a communication or connectivity service between a first location and at least a second location based on optical data transmission of a user-defined optical signal, wherein the telecommunications network comprises a backbone network and/or an aggregation network as well as an access network, and broadband access network and the telecommunications network and its infrastructure being used to both provide end-user communication services and/or IP connectivity to a multitude of end-users connected to the access network, and connect the first location and the at least second location via at least access network infrastructure and/or aggregation network infrastructure comprising a plurality of optical network nodes, wherein the telecommunications network comprises, at the first location, at least one optical data transmission fiber for providing the communication or connectivity service, wherein, in order to initiate the communication or connectivity service, the broadband access network or the telecommunications network is configured such that an optical initialization signal is received by an optical safety and policy entity or functionality of the telecommunications network, and the identity of or associated to the optical initialization signal is determined by the optical safety and policy entity or functionality, and, dependent on the determined identity of the optical initialization signal, the communication or connectivity service between the first location and the second location is activated.

Furthermore, the present invention relates to a system for initiating to provide, via a telecommunications network, a communication or connectivity service between a first location and at least a second location based on optical data transmission of a user-defined optical signal, wherein the telecommunications network comprises a backbone network and/or an aggregation network as well as an access network, and the broadband access network and the telecommunications network and its infrastructure being used to both provide end-user communication services and/or IP connectivity to a multitude of end-users connected to the access network, and connect the first location and the at least second location via at least access network infrastructure and/or aggregation network infrastructure comprising a plurality of optical network nodes, wherein the telecommunications network comprises, at the first location, at least one optical data transmission fiber for providing the communication or connectivity service, wherein, in order to initiate the communication or connectivity service, the system is configured such that an optical initialization signal is received by an optical safety and policy entity or functionality of the telecommunications network, and the identity of or associated to the optical initialization signal is determined by the optical safety and policy entity or functionality, and, dependent on the determined identity of the optical initialization signal, the communication or connectivity service between the first location and the second location is activated.

Additionally, the present invention relates to an optical safety and policy entity or functionality or to a central office point of delivery comprising an optical safety and policy entity or functionality provided to be used as part of a system or as part of a broadband access network or telecommunications network according to embodiments of the present invention.

Still additionally, the present invention relates to a program comprising a computer readable program code which, when executed on a computer and/or on a network node of a telecommunications network and/or on an optical safety and policy entity or functionality, or in part on the network node of a telecommunications network and/or in part on the optical safety and policy entity or functionality, causes the computer and/or the network node of the telecommunications network and/or the optical safety and policy entity or functionality to perform a method according to embodiments of the present invention.

Furthermore, the present invention relates to a computer-readable medium comprising instructions which when executed on a computer and/or on a network node of a telecommunications network and/or on an optical safety and policy entity or functionality, or in part on the network node of a telecommunications network and/or in part on the optical safety and policy entity or functionality, causes the computer and/or the network node of the telecommunications network and/or the optical safety and policy entity or functionality to perform a method according to embodiments of the present invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun. e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order; this is especially the case for the terms "first step", "second step", etc. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—at least a fixed line part. A mobile (or cellular) part may be present as well, as part of the telecommunications network 100. User equipments or client devices are connected to the telecommunications network 100 via a (broadband) access network 120. The telecommunications network 100 comprises, especially as part of the broadband access network 120, at least one logical or physical central office point of delivery 110 that is preferably realized within a (mini) data center and that is especially handling different access requirements, especially different access possibilities, of the client devices to network functionalities provided by the telecommunications network 100 or via the telecommunications network 100. In addition, the telecommunications network 100 typically also comprises—besides the broadband access network 120—a core network 101. The client devices are typically connected to the logical or physical central office point of delivery 110 via a customer premises equipment device 50, 50' or via a customer premises equipment functionality that might be built into or realized by the client devices. Preferably but not necessarily, the central office point of delivery 110 comprises a switching fabric 115 comprising a plurality of spine network nodes and typically also a plurality of leaf network nodes.

Figure 2:
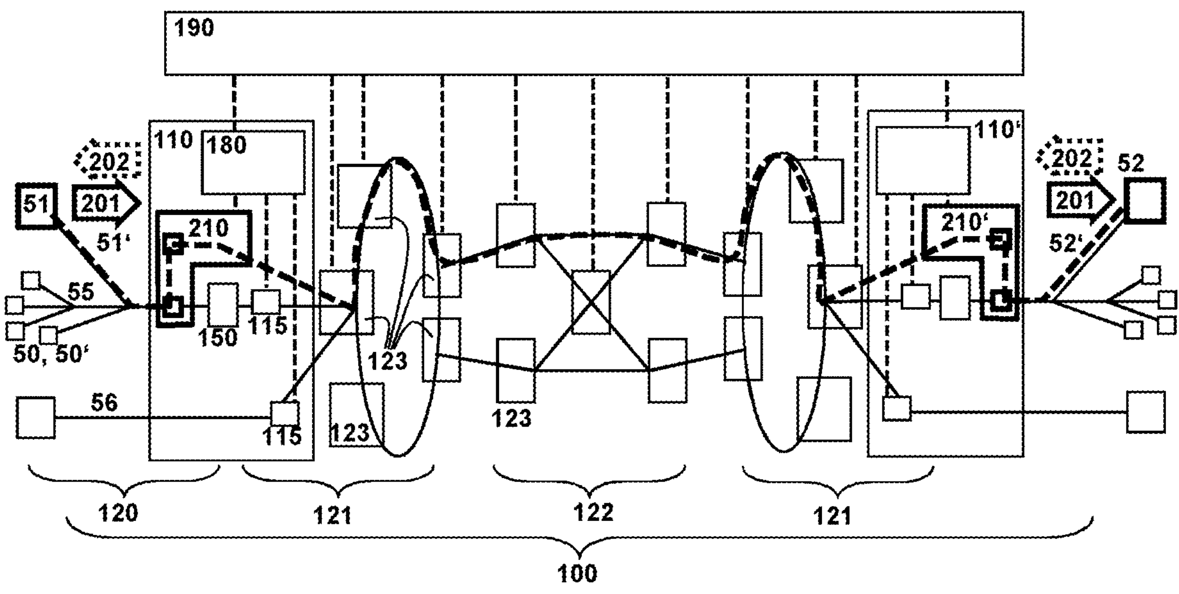
FIG. 2 schematically shows the telecommunications network providing a communication or connectivity service between a first location and a second location based on optical data transmission of a user-defined optical signal, the telecommunications network comprising a backbone network and/or an aggregation network as well as the access network.

FIG. 2 schematically shows the telecommunications network 100 providing a communication or connectivity service between a first location 51 and a second location 52 based on optical data transmission of a user-defined optical signal 201, the telecommunications network 100 comprising a backbone network 122 and/or an aggregation network 121 as well as the access network 120. Furthermore, the telecommunications network 100 comprises a network orchestrator 190. According to the present invention, the first location 51 is linked to the telecommunications network 100 via at least one first optical data transmission fiber 51', and the second location 52 is linked to the telecommunications network 100 via at least one second optical data transmission fiber 52'.

Typically according to the present invention, but not necessarily, the communication or connectivity service between the first location 51 and the at least second location 52 also involves the optical data transmission of a further user-defined optical signal 202.

Furthermore according to the present invention, the broadband access network 120 comprises an optical safety and policy entity or functionality 210 connecting the first location 51 and/or the first optical data transmission fiber 51' to the telecommunications network 100, especially to its aggregation network 121 and/or its backbone network 122, wherein the optical safety and policy entity or functionality 210 provides for a protection of the optical transmission functionality (especially with regard to the backbone network 122 and/or the aggregation network 121), for a policy decision functionality, and for a policy enforcement functionality regarding the user-defined optical signal 201. Likewise, typically, the broadband access network 120 comprises a further optical safety and policy entity or functionality 210' connecting the second location 52 and/or the second optical data transmission fiber 52' to the telecommunications network 100, especially to its aggregation network 121 and/or its backbone network 122, wherein the further optical safety and policy entity or functionality 210' provides for a protection of the optical transmission functionality (especially with regard to the backbone network 122 and/or the aggregation network 121), for a policy decision functionality, and for a policy enforcement functionality regarding the further user-defined optical signal 202.

In the exemplary embodiment shown in FIG. 2, the optical safety and policy entity or functionality 210 is co-located with the at least one central office point of delivery 110, and especially the central office point of delivery 110 comprises or is coupled with the optical safety and policy entity or functionality 210. Likewise in the exemplary embodiment shown in FIG. 2, the further optical safety and policy entity or functionality 210' is co-located with a further central office point of delivery 110', and especially the further central office point of delivery 110' comprises or is coupled with the further optical safety and policy entity or functionality 210'. However, this symmetrical architecture (regarding the connection of the first and the second location 51, 52 to the telecommunications network 100) is only exemplarily shown in FIG. 2, and the first location 51 is able to be linked to the telecommunications network 100 in a different manner compared to the second location 52.

As part of the central office point of delivery 110, an access node 150 is schematically shown; such access nodes 150 are typically used, as part of their respective central office points of delivery 110, 110', to connect end-users 50, 50' to the access network 120, and thereby to the telecommunications network 100, as this is schematically shown in FIG. 1. Furthermore as part of the central office point of delivery 110, a switching fabric 115 (or, rather two instances of a switching fabric) is schematically shown in FIG. 2. In FIG. 2, the end-users 50, 50' are schematically shown as connected to the access network 120 via an optical communication link 55, especially a passive optical network, PON. Alternatively to using a passive optical network 55, a point-to-point connection 56, especially an optical point-to-point connection 56, is schematically shown in FIG. 2. Furthermore as part of the central office point of delivery 110, an orchestrator entity or functionality 180 is schematically shown in FIG. 2.

According to the present invention, the communication or connectivity service between the first and second location 51, 52 is able to be established (in order to transmit the user-defined optical signal 201 and/or the further user-defined optical signal 202) while still the telecommunications network 100 and its infrastructure providing (or being able to provide) the end-user communication services and/or IP connectivity to the end-users 50, 50'. According to the present invention, it is advantageously possible to transmit the user-defined optical signal 201 between the first and second location 51, 52 via, in a first step, feeding or inputting the user-defined optical signal 201 to the first optical data transmission fiber 51', and, in a second step, receiving the user-defined optical signal 201 at the second optical data transmission fiber 52'. Thereby, it is especially meant that the user-defined optical signal 201 is received at the second location 52 as it is fed or input at the first location 51, i.e. essentially without being modified between the first and second location 51, 52. Accordingly (but not necessarily as mentioned), the communication or connectivity service between the first location 51 and the at least second location 52 also involves the optical data transmission of the further user-defined optical signal 202, which is likewise fed or input (in order to be transmitted in opposing direction with regard to the user-defined optical signal 201) to the second optical data transmission fiber 52' and received at the first optical data transmission fiber 51'. This is schematically represented, in FIG. 2, via arrows and reference signs 201 and 202, respectively.

FIG. 2 schematically shows a path that the user-defined optical signal 201 takes from the first location 51 to the second location 52 through the telecommunications network 100; this path is schematically indicated via a bold dashed line in FIG. 2. In FIG. 2, the case is schematically shown that also the further user-defined optical signal 202 (travelling, or being transmitted, in opposing direction compared to the user-defined optical signal 201) takes the same path as schematically shown for the user-defined optical signal 201. However, this is not always mandatorily realized; Both the backbone network 122 and also aggregation networks 121 are schematically shown as comprising a plurality of network nodes 123. Typically, there are different paths through the telecommunications network 100 or its infrastructure that are possible between any first and second location, and the further user-defined optical signal 202 might well travel (or be transmitted) using a different path from the path of the user-defined optical signal 201.

Figure 3:
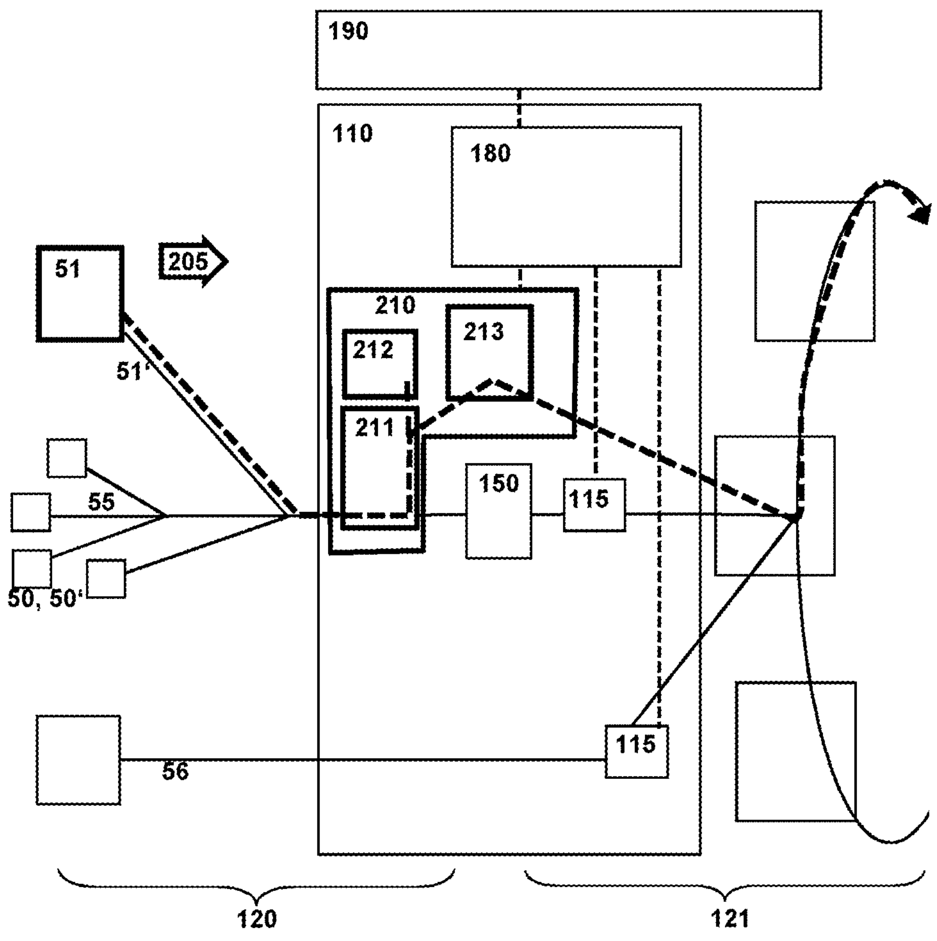
FIG. 3 schematically shows in greater detail the first location and its connection to the telecommunications network.

In FIG. 3, the first location 51 and its connection to the telecommunications network 100 is schematically shown in greater detail. Again, the first location 51 is linked to the telecommunications network 100 via the first optical data transmission fiber 51'. And again, the broadband access network 120 comprises the optical safety and policy entity or functionality 210 connecting the first location 51 and/or the first optical data transmission fiber 51' to the telecommunications network 100. The optical safety and policy entity or functionality 210 provides for a protection of the optical transmission functionality, for a policy decision functionality, and for a policy enforcement functionality regarding the user-defined optical signal 201. Again, in the exemplary embodiment shown in FIG. 2, the optical safety and policy entity or functionality 210 is co-located with the at least one central office point of delivery 110. The optical safety and policy entity or functionality 210 especially comprises a splitter entity or functionality 211, an optical detection entity or functionality 212, and an optical policy enforcement entity or functionality 213.

FIG. 3 furthermore schematically shows an initialization signal 205 in order to represent a further preferred embodiment of the present invention. The initialization signal 205 is fed or input to the first optical data transmission fiber 51' in order for the communication or connectivity service between the first and second location 51, 52 to be initiated. The user-defined optical signal 201 (and likewise the further user-defined optical signal 202) corresponds to an operative signal to be transmitted between the first and second location 51, 52. However, in order to establish the communication service (i.e. the user-defined optical signal 201 being fed or input to the first optical data transmission fiber 51' and received at the second optical data transmission fiber 52'), the initialization signal 205 is fed or input to the first optical data transmission fiber 51'. The initialization signal 205 is detected by the optical safety and policy entity or functionality 210, and subsequently an optical and transparent user plane point-to-point connection is realized between the first and second location 51, 52. However, this communication or connectivity service is refused in case that the initialization signal 205 is invalid. Thereby, it is—inter alia—advantageously possible to protect the transmission functionality of the telecommunications network 100, especially with regard to the backbone network 122 and/or the aggregation network 121.

Figure 5:
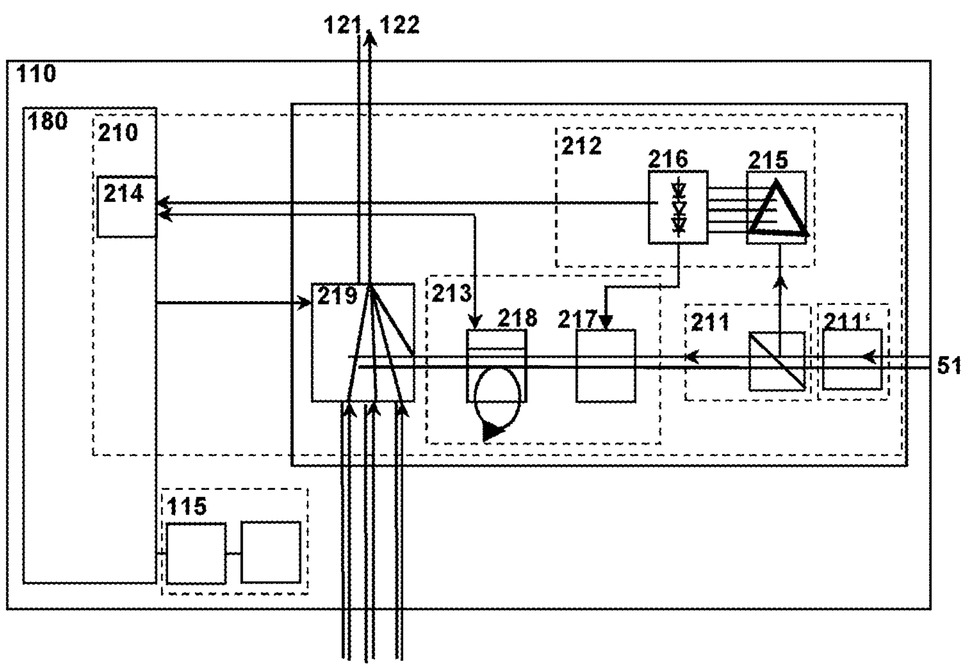
FIG. 5 schematically shows in greater detail the optical safety and policy entity or functionality or the central office point of delivery comprising the optical safety and policy entity or functionality.

In FIG. 5, the optical safety and policy entity or functionality 210 or the central office point of delivery 110 comprising the optical safety and policy entity or functionality 210 is schematically shown in greater detail. Again, the optical safety and policy entity or functionality 210 comprises the splitter entity or functionality 211 as the first entry (towards the telecommunications network 100) of the user-defined optical signal 201 (and/or of the optical initialization signal 205) being fed to the first optical data transmission fiber 51'. Alternatively according to the present invention, the splitter entity or functionality 211 is not the first entry (towards the telecommunications network 100) of the user-defined optical signal 201 (and/or of the optical initialization signal 205) being fed to the first optical data transmission fiber 51' but a protective attenuator device 211' is provided as the first entry (towards the telecommunications network 100) of the user-defined optical signal 201 (and/or of the optical initialization signal 205). The protective attenuator device 211' provides for a comparatively fast attenuation or shutdown of the user-defined optical signal 201 and/or of the optical initialization signal 205 transmitted to the telecommunications network 100 and/or allows for a comparatively coarse optical attenuation in terms of spectral width and/or resolution.

Via the splitter entity or functionality 211, a certain fraction (or measuring signal) of the optical power of the user-defined optical signal 201 (and/or of the optical initialization signal 205) is branched off towards the optical detection entity or functionality 212, such as, e.g., between 1% and 30% of the optical power, preferably between 3% and 20% of the optical power, more preferably between 5% and 10% of the optical power. Via the optical detection entity or functionality 212, the branched off part of the user-defined optical signal 201 is analyzed, especially via decomposing the incoming light (i.e. the branched off part of the user-defined optical signal 201) into spectral components, especially via using, e.g., an arrayed waveguide grating 215 or an alternative spectral filter (or filter device) and/or via using a channel indicator and/or channel power measurement entity 216. As part of the optical detection entity or functionality 212, a coarse channel function is able to be realized via a spectral differentiation of pre-configured channels; a fine or flexible spectral function is able to be realized via spectral decomposition of sub-channel-granular frequency components to address flexible lambda channels with different width in a flexgrid. These measurement results are provided to the optical policy enforcement entity or functionality 213 that especially comprises a variable optical attenuator 217 and/or an SLA-limiter and/or SLA-measurement entity 218. Thereby, it is advantageously possible to realize an abstraction function: From the measured optical parameters, service properties are able to be calculated, especially the bandwidth or optical bandwidth (or spectral width) that the communication or connectivity service between the first and second location 51, 52 is able to use. Together with an optical policy decision function 214 (that is especially part of the control plane 180 (or orchestrator entity or functionality 180) of the central office point of delivery 110), the optical detection entity or functionality 212, and the optical policy enforcement entity or functionality 213 is able to provide for a translation of the service level agreement (SLA) into and optical parameter control: the SLA properties or parameters are translated top-down into physical control parameters of the optical channel or spectral window able to be used by the communication or connectivity service between the first and second location 51, 52. In case all conditions are fulfilled in order to transmit the user-defined optical signal 201 into the optical (backbone and/or aggregation) network, a switching entity 219, such as a ROADM (reconfigurable optical add drop multiplexer) is controlled or triggered to transmit the user-defined optical signal 201.

Hence, advantageously according to the present invention, an SLA control and the provision of (optical) network safety, as well as a managed optical service control (especially the prevention of alien wavelengths) is able to be realized via a policy decision and policy enforcement entity or functionality, provided by the optical safety and policy entity or functionality 210 and its components or entities, thereby especially also realizing a policy decision function, a policy enforcement function, and a network safety enforcement function (NSEF). The network safety enforcement function is especially required due to the fact that the network termination device (NT) is located at the customer premises, i.e. at the first location 51. The customer is enforced to apply their own optical module to align the fiber (i.e. the first optical data transmission fiber 51') by their own protocol and user plane traffic. Due to the free access to the optical plane of the fiber network (i.e. the aggregation and/or backbone network of the telecommunications network 100), the customer may also irradiate any laser light, either at a wavelength or at wavelengths that disturb(s) other lambda channels in the shared optical network or laser light with too high power (which may saturate optical amplifiers, and thus reducing their gain for all channels, so the optical transmission for all channels would be interrupted; or it could interfere with neighboring channels by non-linear crosstalk, e.g. via cross-phase multiplexing/XPM or four wave mixing/FWM). Hence, the network safety enforcement function protects the optical nodes of the telecommunications network 100 from unintended failures or misbehavior of customers (and from sabotaging attackers).

A crucial problem for carriers to offer lambda services to customers is the difficulty to control and limit the usage of the optical lambda channels. This is similar to the offering of dark fiber to customers. In both cases the customer (in most cases a wholesale customer with own retail customers) is technically capable to use the basic physical resource of the carrier to perform any protocol and to transmit any bandwidth and to exploit any physical property for his own retail customers.

According to the present invention, the policy enforcement function limits the physical properties of the offered lambda channel by different technical sub devices that have a direct impact on these properties in a controlled manner. The customer (e.g. wholesale customer) concludes a contract with the carrier (i.e. the operator of the telecommunications network 100) on a certain service level agreement (SLA). The carrier uses the policy decision function (PDF) to measure properties of the optical lambda channel, in order to calculate abstracted service parameters therefrom and to compare them with the granted service SLA from the contract. The policy enforcement function (PEF) is composed by different elements to adjust the optical parameters of the traversing optical signal until the PDF and its SLA abstraction function correspond to each other. Especially, a direct control or an iterative loop of a control circuit is preferably implemented, such as a control loop of the following entities:

- physical adjustment of one or more physical parameters,
- measurement of the parameters,
- abstraction to service parameters,
- comparison with contract SLAs,
- estimation of re-adjustable physical parameters by the offset (top-down-translation).

Figure 4:
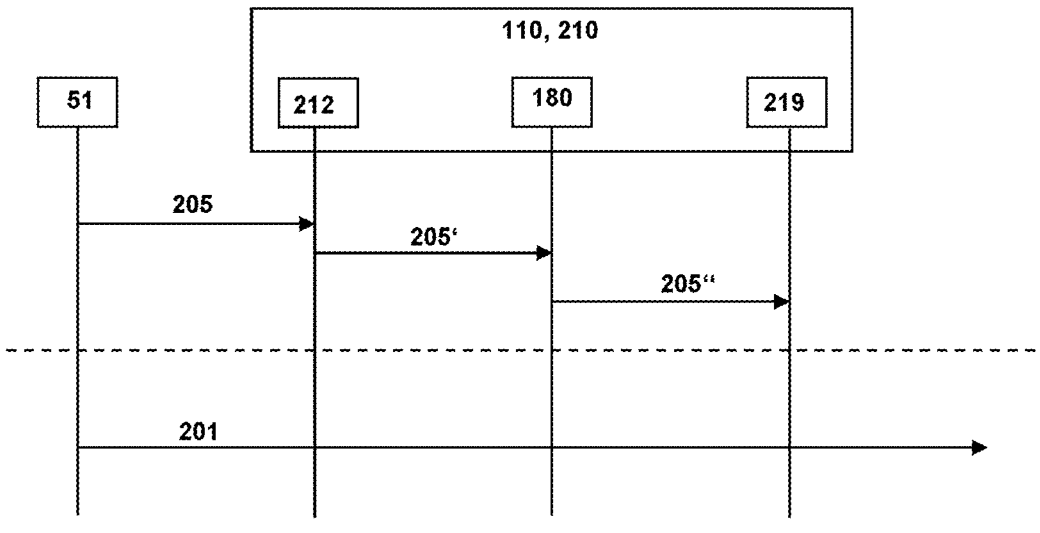
FIG. 4 schematically shows a communication diagram representing the initialization of the communication or connectivity service based on optical data transmission of the user-defined optical signal.

In FIG. 4, a communication diagram is schematically shown, representing the initialization of the communication or connectivity service based on optical data transmission of the user-defined optical signal 201. In the exemplary representation shown in FIG. 4, the optical safety and policy entity or functionality 210 (and its components) is shown co-located with the central office point of delivery 110, hence reference sign "110, 210". The communication diagram shows the first location 51, and furthermore, as part of or co-located with the central office point of delivery 110, an NT-UP (network termination user plane) entity or functionality, especially corresponding to the optical detection entity or functionality 212 (of the optical safety and policy entity or functionality 210), the orchestrator entity or functionality 180 (or another control plane functionality) of the central office point of delivery 110, and a wavelength-selective switch 219 as part of the optical safety and policy entity or functionality 210 (especially a switching entity 219, such as a ROADM, reconfigurable optical add drop multiplexer). Prior to the user-defined optical signal 201 being able to be sent—i.e. prior to its path being set up—, the optical initialization signal 205 (or first optical initialization signal 205) is transmitted (through the first optical data transmission fiber 51') to the NT-UP entity or functionality (especially the optical detection entity or functionality 212) of the optical safety and policy entity or functionality 210. The optical initialization signal 205 is also called pilot lambda signal or pilot lambda. In a subsequent processing step shown in FIG. 4, the optical detection entity or functionality 212 sends or transmits a port-up message (also called $NT_1$ port-up message) 205' to the orchestrator entity or functionality 180 of the central office point of delivery 110 (or of the optical safety and policy entity or functionality 210). Furthermore, in a still subsequent processing step shown in FIG. 4, the orchestrator entity or functionality 180 (of the central office point of delivery 110 or of the optical safety and policy entity or functionality 210) sends or transmits a configuration message 205" (also called set lambda $NT_{1-2}$ and used to set or to configure a spectral window or an optical channel through the optical network nodes of the telecommunications network 100 (especially involving the backbone network 122 and/or the aggregation network 121) from the optical safety and policy entity or functionality 210 (or the respective central office point of delivery 110) to the further optical safety and policy entity or functionality 210' (or the respective central office point of delivery 110') in order to be able to provide the communication or connectivity service between the first location 51 and the second location 52) to the switching entity 219. In a subsequent processing step, the optical path through the network (also called optical transport network path) is able to be set up such that the user-defined optical signal (201) is able to be transmitted from the first location 51, along the optical path, to the second location 52. Hence, the verification of the optical initialization signal 205 takes place at the central office point of delivery 110 and/or at the optical safety and policy entity or functionality 210 (especially the detection entity or functionality 212) and the wavelength-selective switch 219 is instructed to allow the user-defined optical signal 201 to be operative.

According to the present invention, the manner of production of the lambda service (passive and active fiber based) or lambda services are preferably embedded, within a disaggregated network architecture, with the central office point of delivery 110 110' between the access network 120 and the transport network (aggregation 121 and core network domains 122 (or backbone network 122)). In this manner, the central office point of delivery 110, 110' is especially an important network node which combines a set of multiple disaggregated functions of the service and network user plane (UP), the control plane (CP) and the management plane (MP).

The end-to-end production, i.e. connectivity between the first and second locations 51, 52, of the lambda services has to be realized over different network domains: The service starts at the first location 51 that especially correspond to the customer premises of the user or customer using the communication or connectivity service or lambda service: The network termination of the network provider (i.e. the telecommunications network 100) is especially a pure fiber tail, no further technical equipment. The technical equipment, the network termination (NT) with the laser-optical transmitter and receiver will be provided by the customer and there is a flexible choice.

The optical signal (i.e. the user-defined optical signals 201, 202) being delivered by the customer itself can be used as agnostic underlay layer (Layer 0) for any other higher-layer protocols on top (e.g. for Layer 1/OTN services, for Layer 2/Ethernet services, for Layer 3/IP services and/or SD-WAN/OTT or else).

The optical signal from the customer is connected via fiber (passive or active, i.e. optically amplified fiber) through the access network 120 with the central office point of delivery 110, 110'.

The central office point of delivery 110, 110' (or, rather the optical safety and policy entity or functionality 210, 210', being located at the central office point of delivery or co-located) is the first entrance point, detects the first sign of life (i.e. the initialization signal 205), it unlocks the connection, it controls the properties of the service via policy decision and policy enforcement functions. The central office point of delivery 110 (i.e. the optical safety and policy entity or functionality 210) connects the lambda service from the access with the next network domain, the aggregation network 121.

The lambda service is routed through the aggregation network 121 to all adjacent networks (aggregation and backbone networks 121) and from there to its destination location (second location 52)—especially at another premises of the customer. For a point-to-point lambda connection, two optical safety and policy entity or functionalities 210, 210' (or two central office points of delivery 110, 110') are typically engaged.

The end-to-end lambda service is managed by a disaggregated architecture, including several user plane (UP) and control plane (CP) functional building blocks that are especially placed at the central office points of delivery, at network elements along the service route, at hierarchical controller and orchestrator entities and OSS/BSS entities.

According to the present invention, it is especially advantageous that, regarding the first sign of life (i.e. the optical initialization signal or the further optical initialization signal) any customer-defined optical device is possible. At the initialization stage, the central office point of delivery 110 (or, rather, the optical safety and policy entity or functionality 210 typically co-located with the central office point of delivery 110) still blocks the optical light from the customer (towards the aggregation and/or backbone network) and ensures laser safety of the entire active fiber-based transport network behind the central office point of delivery 110/the optical safety and policy entity or functionality 210. The control plane function module (especially the orchestrator entity or functionality 180) as part of the central office point of delivery 110 analyses the incoming light of the optical initialization signal 205 (especially its spectrum, amplitude/power) and knows and avoids harm to the network (e.g. in case of a too high power or amplitude level) and to the services of other customers (too high power and overlapping optical spectrum). According to the present invention, there are different options for the first sign of life and customer service authorization:

- according to one alternative, there is only unidentified light by an unknown source and customer; its spectrum and power are measured, limited and signal transit is blocked until authorization. The fiber input port (i.e. the information from where the optical initialization signal arrives at the optical safety and policy entity or functionality 210, i.e. through which fiber) allows for topological case reduction. Time stamp plus Fiber/fiber port plus measured lambda and spectral window will be compared with the data from the BSS data base (for instance an orchestrator can arrange this by communicating with the POD that detected the incoming light). If the data correlate to be correct (customer contract), the provisioning process will be continued until the end-to-end service is "on". The destination fiber and destination POD are derived from the customer contract data saved at BSS/OSS. According to a further variant, after service establishment, the customer is especially asked (e.g. via a web portal or email) to confirm the service connection and/or optionally the SLA conformity.
- according to a further alternative, there is an ID (an identifier information) accompanied with the light (of the optical initialization signal 205) that is launched by a unknown source/customer. The optical safety and policy entity or functionality 210 (or central office point of delivery 110) is able to detect the ID of the signal which is directly part of the physical optical layer. Because no other higher OSI layers or any digital protocols are engaged (it is a pure analogue physical sign of life coming from the input fiber in the optical safety and policy entity or functionality 210 or central office point of delivery 110). There are different detection options for the optical safety and policy entity or functionality 210 such that the ID or identifier information is able to be recognized and decoded (i.e. for the ID different technologies are possible):
- a pilot tone (e.g. as a low frequency modulation on top of the customer's light spectrum) might be used; the code and the kind of such a pilot tone must meet (in order for the optical initialization signal 205 to be held as valid) the specifications published by the network carrier, i.e. the telecommunications network 100; If code format and kind of tone does not comply with the published rules of the network operator, it will not be identified and is able to be omitted and blocked by the optical safety and policy entity or functionality 210 or the central office point of delivery 110.

As a variant in such a situation: If the customer is able to be identified by the concept only using unidentified light by an unknown source and customer (with a measurement of its spectrum and power, described above) the service may be setup also without a valid recognized ID.

- a pilot frequency: The pilot signal does not need to be modulated on top of the entire spectrum, it may also be applied only to a part of the spectrum (narrow band spectral section) which is able to be detected by the optical safety and policy entity or functionality 210 or the central office point of delivery 110, e.g. via frequency wobbling narrow band filter and ID decoder.

After the customer and its service has been authorized, the optical safety and policy entity or functionality 210 and/or the central office point of delivery 110 orders the path calculation and path enabling (optical transport node switching) at the overarching network orchestrator 190. The orchestrator 190 sends a message on the performed optical transit connectivity to both central office points of delivery (i.e. the central office point of delivery and the further central office point of delivery 110, 110') of the end-to-end communication (or service) link. Both central office points of delivery open their ports to the core network, and both central office points of delivery adjust the transit parameters according to the SLA parameters of the customer contract. Thereafter, the customer is notified about the service being "on" either via a Web portal/email or via pilot tone modulation (e.g. of the above-mentioned type) on top of the downstream optical spectrum. This information is especially compliant to the code published by the NW operator.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for initiating, via a telecommunications network, a communication or connectivity service between a first location and a second location based on optical data transmission of a user-defined optical signal, wherein the telecommunications network comprises a backbone network and/or an aggregation network as well as an access network, and the telecommunications network is used to (1) provide end-user communication services and/or IP connectivity to a multitude of end-users connected to the access network, and (2) connect the first location and the second location via at least access network infrastructure and/or aggregation network infrastructure comprising a plurality of optical network nodes, wherein the telecommunications network comprises, at the first location, at least one optical data transmission fiber for providing the communication or connectivity service, wherein the method comprises the following steps:

in a first step, an optical initialization signal is fed or input to the optical data transmission fiber;

in a second step, the optical initialization signal is received by an optical safety and policy entity or functionality of the telecommunications network, and an identity of the optical initialization signal is determined by the optical safety and policy entity or functionality, wherein the identity of the optical initialization signal corresponds to an identity of a customer providing the identity of the optical initialization signal; and in a third step, dependent on the determined identity of the optical initialization signal, the communication or connectivity service between the first location and the second location is authorized and activated.

2. The method according to claim 1, wherein the telecommunications network comprises, at the second location, at least one further optical data transmission fiber for providing the communication or connectivity service, wherein, between the first and second location, the telecommunications network comprises a transmission functionality regarding the backbone network and/or the aggregation network and/or the access network that is based on optical data transmission.

3. The method according to claim 2, wherein, in a fourth step, a further optical initialization signal is fed or input to the at least one further optical data transmission fiber, and wherein, in a fifth step, the further optical initialization signal is received by a further optical safety and policy entity or functionality of the telecommunications network, and the identity of the further optical initialization signal is determined by the further optical safety and policy entity or functionality, wherein establishment or the activation of the communication or connectivity service between the first location and the second location is dependent on both the determined identity of the optical initialization signal and the determined identity of the further optical initialization signal.

4. The method according to claim 3, wherein establishment or the activation of the communication or connectivity service between the first location and the second location is refused in case that identity determination of one or both of the optical initialization signal and the further optical initialization signal fails, wherein the transmission functionality of the telecommunications network, with regard to the backbone network and/or the aggregation network, is protected by the optical safety and policy entity or functionality and/or by the further optical safety and policy entity or functionality.

5. The method according to claim 3, wherein determining the identity of the optical initialization signal and/or of the further optical initialization signal is based on determining physical properties of the optical initialization signal and/or of the further optical initialization signal, and involves determining one or a plurality of the following:

the spectrum of the optical initialization signal and/or of the further optical initialization signal, the amplitude or the power of the optical initialization signal and/or of the further optical initialization signal, timestamp information of the optical initialization signal and/or of the further optical initialization signal, or identity information of the optical initialization signal and/or of the further optical initialization signal.

6. The method according to claim 2, wherein the access network comprises the optical safety and policy entity or functionality connecting the first location and/or the at least one optical data transmission fiber to the transmission functionality of the telecommunications network, wherein the optical safety and policy entity or functionality provides for protection of optical transmission functionality, with regard to the backbone network and/or the aggregation network, policy decision functionality, and policy enforcement functionality regarding the user-defined optical signal and/or a further user-defined optical signal, wherein the access network comprises at least one central office point of delivery comprising or coupled with the optical safety and policy entity or functionality, wherein the access network comprises a further central office point of delivery that connects the second location and/or the at least one further optical data transmission fiber to the transmission functionality of the telecommunications network, wherein thereby the communication or connectivity service between the first location and the second location is able to be realized as an optical and transparent user plane point-to-point connection.

7. The method according to claim 1, wherein the access network comprises a central office point of delivery, wherein the central office point of delivery comprises a plurality of access nodes and an orchestrator entity or functionality, wherein the plurality of access nodes provide optical network termination functionality to one or a plurality of end-users in view of the end-users being provided with IP connectivity by the telecommunications network, wherein the end-users are connected to the telecommunications network via access network infrastructure which includes optical fiber infrastructure.

8. The method according to claim 1, wherein the access network comprises a central office point of delivery, wherein the first location is connected to the central office point of delivery, via the at least one optical data transmission fiber, using at least one of the following:

a passive optical fiber as a point-to-point link, an active optical fiber, or a passive optical network.

9. The method according to claim 1, wherein determining the identity of the optical initialization signal is based on determining physical properties of the optical initialization signal.

10. The method according to claim 9, wherein the physical properties comprise a spectrum, a power, an amplitude, a pilot tone, or a pilot frequency of the optical initialization signal.

11. The method according to claim 1, wherein the optical initialization signal is a first sign of life from customer-injected optical light.

12. The method according to claim 1, wherein the optical safety and policy entity or functionality determines the identity of the optical initialization signal from physical properties of the optical initialization signal, and blocks the communication or connectivity service until authorization is complete.

13. A system for initiating a communication or connectivity service between a first location and a second location based on optical data transmission of a user-defined optical signal, the system comprising:

a telecommunications network, wherein the telecommunications network comprises a backbone network and/or an aggregation network as well as an access network, and the telecommunications network is configured to:
provide end-user communication services and/or IP connectivity to a multitude of end-users connected to the access network; and
connect the first location and the second location via at least access network infrastructure and/or aggregation network infrastructure comprising a plurality of optical network nodes;

wherein the telecommunications network comprises, at the first location, at least one optical data transmission fiber for providing the communication or connectivity service;

wherein an optical safety and policy entity or functionality of the telecommunications network is configured to:
receive an optical initialization signal; and
determine an identity of the optical initialization signal, wherein the identity of the optical initialization signal corresponds to an identity of a customer providing the identity of the optical initialization signal; and wherein the communication or connectivity service between the first location and the second location is authorized and activated based on the determined identity of the optical initialization signal.

14. A non-transitory computer-readable medium having processor-executable instructions stored thereon for initiating, via a telecommunications network, a communication or connectivity service between a first location and a second location based on optical data transmission of a user-defined optical signal, wherein the telecommunications network comprises a backbone network and/or an aggregation network as well as an access network, and the telecommunications network is used to (1) provide end-user communication services and/or IP connectivity to a multitude of end-users connected to the access network, and (2) connect the first location and the second location via at least access network infrastructure and/or aggregation network infrastructure comprising a plurality of optical network nodes, wherein the telecommunications network comprises, at the first location, at least one optical data transmission fiber for providing the communication or connectivity service, wherein the processor-executable instructions, when executed, facilitate performance of the following steps:

in a first step, an optical initialization signal is fed or input to the optical data transmission fiber;

in a second step, the optical initialization signal is received by an optical safety and policy entity or functionality of the telecommunications network, and an identity of the optical initialization signal is determined by the optical safety and policy entity or functionality, wherein the identity of the optical initialization signal corresponds to an identity of a customer providing the identity of the optical initialization signal; and in a third step, dependent on the determined identity of the optical initialization signal, the communication or connectivity service between the first location and the second location is authorized and activated.

* * * * *